Figure 1:
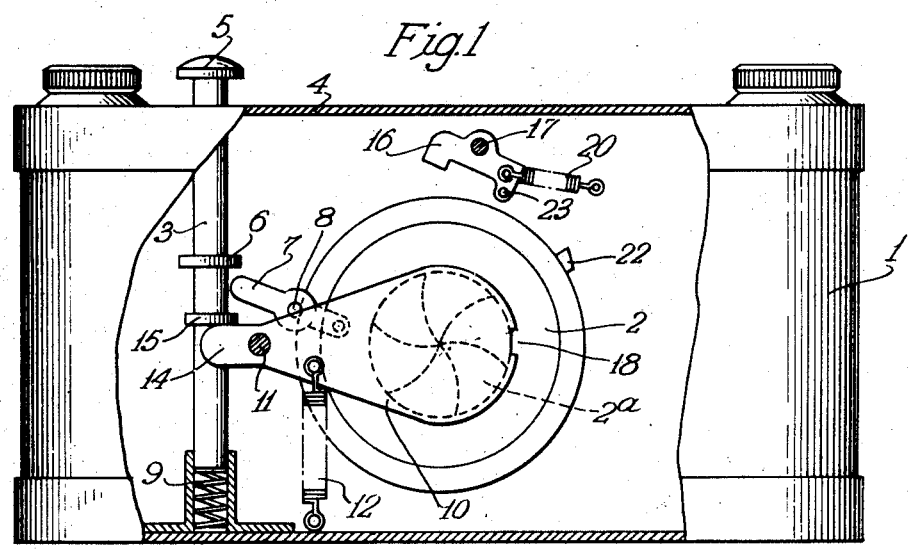

Feb. 11, 1941.     W. SEIFERT     2,231,094
PHOTOGRAPHIC CAMERA
Filed Dec. 1, 1939

Inventor:
Werner Seifert
By:
Singer, Ehlert, Stern & Carlberg
Attorneys:

Patented Feb. 11, 1941

2,231,094

UNITED STATES PATENT OFFICE 2,231,094

PHOTOGRAPHIC CAMERA

Werner Seifert, Dresden, Germany, assignor to Zeiss Ikon Aktiengesellschaft, Dresden, Germany Application December 1, 1939, Serial No. 307,045
In Germany October 8, 1938

6 Claims. (Cl. 95—63)

The invention relates to improvements in photographic cameras, and particularly is directed to rollfilm cameras in which the shutter is mounted in rear of the photographic objective.

In photographic cameras in which the shutter is mounted in rear of the objective, there is danger that due to light leaks the film may be affected whenever the blades of the shutter do not close completely or fail to overlap sufficiently. This danger is greater the closer the blades of the shutter are arranged to the plane of the film, a condition which exists particularly in the modern miniature cameras which employ lenses of short focal length and relatively large apertures.

It is now the principal object of the invention to overcome this disadvantage, by providing a light guard or film protector directly to the rear of the customary shutter, this guard intercepting the passage of the light rays. The guard may comprise a light obstructing slide, a pivotally mounted plate or a plurality of additional cooperating shutter blades.

Another object of the invention is to operatively connect the light guard with the shutter release device in such manner that an instant prior to the release of the shutter, the guard member obstructing the passage of the light is lifted.

Still another object of the invention is to provide means for holding the light guard in its inoperative position until the shutter has completed its exposure movement, whereupon said holding means is released by an additional member under control of the shutter.

Other objects of the invention will be apparent or will be specifically pointed out in the following description with reference to the accompanying drawing, but the invention is not limited to the embodiment herein described, as various forms may be adopted within the scope of the claims.

Figure 2:
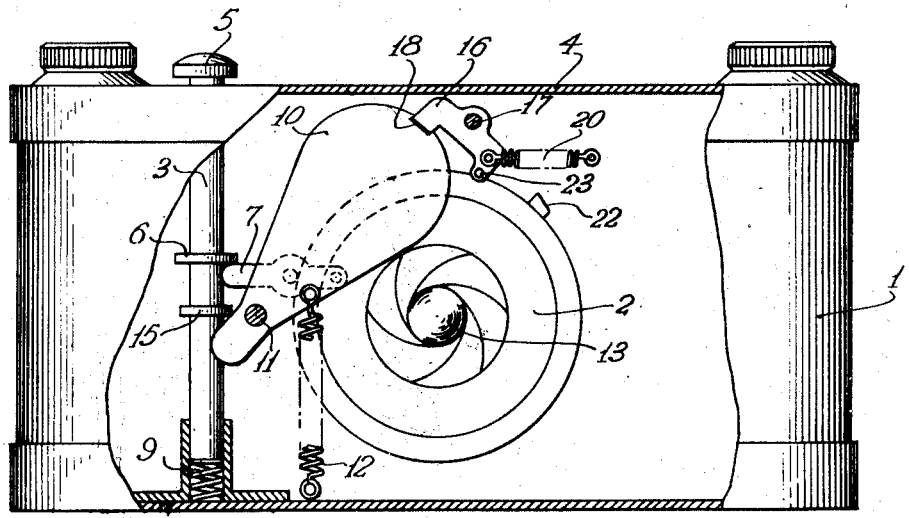

Referring to the drawing:

Fig. 1 illustrates a rear elevation view of a rollfilm camera having a portion of its rear wall removed, so as to show a device of the present invention with the shutter in closed position, and Fig. 2 is a similar view as Fig. 1, except that the parts are illustrated in a different position, namely when the shutter has been released and is in open position.

In the drawing, the casing of the rollfilm camera is designated with 1, and the shutter, 2, which is mounted directly in rear of the photographic objective, with 2. A portion of the photographic objective is visible in Fig. 2 at 13. A vertically slidable shutter release rod 3 extends through the top wall 4 of the camera casing 1 and has at its upper end a knob 5 so as to be readily accessible for operation. A collar 6 on the rod 3 actuates the shutter release lever 7 pivoted between its ends at 8 when the rod 3 is pushed downwardly against the tension of a spring 9 which returns the rod 3 to its initial position illustrated in Fig. 1.

In accordance with the invention, a light guard in the shape of a pear-shaped plate 10 is pivotally mounted on a pin 11 within the camera casing, directly behind the shutter 2, so as to prevent any light which may leak through the shutter blades 2ª from reaching the film. A spring 12 attached with one end to the plate 10 and with the other end to the casing 1 normally maintains the plate 10 in its operative position shown in Fig. 1. In this position a lateral extension 14 of the plate 10 engages a second collar 15 on the shutter release rod 3.

The arrangement of the two collars 6 and 15 on the rod 3 is such, that upon an actuation of the rod 3 by depressing the knob 5, the plate 10 will first be actuated to swing about its pivot pin 11 away from its position behind the shutter 2 and then the collar 6 engages the lever 7 to effect a release of the shutter 2.

When the plate 10 moves toward its inoperative position illustrated in Fig. 2, it engages a pawl 16 pivotally supported between its ends in the camera casing at 17 and rocks this pawl 16 against the tension of a spring 20 in clockwise direction until the pawl 16 engages a notch 18 in the plate 10 (Fig. 2). In this inoperative position the plate 10 is locked and cannot return to its operative position behind the shutter until the pawl 16 is disengaged from the notch 18 in the plate 10. The shutter release rod 3, however, returns immediately upon release into its initial position due to the action of the spring 9.

The release of the pawl 16 from its locking position takes place automatically as soon as the shutter 2 has completed its exposure movement. When the shutter 2 performs its exposure movement a radial projection 22 on a movable part of the shutter is moved against a pin 23 on the tail end of the pawl 16 and rocks the latter clockwise about its pivot 17, thereby lifting the front end of the pawl 16 out of the notch 18. The spring 12 returns now the plate 10 immediately into its initial operative position in rear of the shutter 2 as shown in Fig. 1.

When the shutter 2 is again tensioned for the next exposure, the radial projection 22 returns to its initial position indicated in Fig. 1, the pawl 18 having been returned previously by the spring 20 to its normal position (Fig. 1).

What I claim is:

1. In a rollfilm camera, the combination of a casing, a photographic objective, a shutter in rear of said objective for controlling the exposure of the film, manually operable means for releasing said shutter, a pivotally mounted plate in rear of said shutter within said casing for intercepting light leaking through the shutter when the latter is closed, said pivotally mounted plate being operated by said shutter release means prior to the release of the shutter and being rotated about its pivot into an inoperative non-light intercepting position, means for locking said pivotally mounted plate in its inoperative position, and means operated by the shutter for releasing said locking means from said plate at the end of the exposure, so that said plate returns to its normal light intercepting position.

2. In a rollfilm camera, the combination of a casing, a photographic objective, a shutter in rear of said objective for controlling the exposure of the film, manually operable means for releasing said shutter, and a pivotally mounted plate in rear of said shutter within said casing for intercepting light leaking through the shutter when the latter is closed, said pivotally mounted plate being operated by said shutter release means prior to the release of the shutter and being rotated about its pivot into an inoperative non-light intercepting position, said pivotally mounted plate being provided with a notch on its circumference, a pawl pivotally mounted in the casing in position to be engaged by the movement of said plate toward its inoperative position and adapted to engage said notch to lock said plate in its inoperative position, and means operated by said shutter at the end of its exposure movement for releasing said pawl so that said plate returns to its operative light intercepting position.

3. In a rollfilm camera, the combination of a casing, a photographic objective, a shutter in rear of said objective for controlling the exposure of the film, manually operable means for releasing said shutter, and a pivotally mounted plate in rear of said shutter within said casing for intercepting light leaking through the shutter when the latter is closed, said pivotally mounted plate being operated by said shutter release means prior to the release of the shutter and being rotated about its pivot into an inoperative non-light intercepting position, said pivotally mounted plate being provided with a notch on its circumference, and a pawl pivotally mounted in the casing in position to be engaged by the movement of said plate toward its inoperative position and adapted to engage said notch to lock said plate in its inoperative position, and means independent of said shutter release means and movable with the shutter when the latter performs its exposure movement for releasing said pawl and permitting said plate to return to its operative light intercepting position after the shutter has completed its exposure movement.

4. In a photographic camera, the combination of a casing, a shutter, a shutter release bar, a light intercepting element pivotally mounted in the casing to the rear of the shutter, spring means for normally holding said light intercepting element in its operative position in which it intercepts light leaking through the shutter when the latter is closed, a projection on said shutter release bar engaging a portion of said light intercepting element for moving said light intercepting element to non-intercepting position when said shutter release bar is actuated, a locking pawl in the path of the light intercepting element and adapted to be moved thereby to locking position with respect to said intercepting element when it has reached a non-intercepting position, and means independent of said shutter release bar and movable with the shutter when the latter performs its exposure movement for releasing said locking pawl from said light intercepting element at the end of the exposure movement, so that the light intercepting element returns to its operative position.

5. In a photographic camera, the combination of a casing, a photographic objective, a shutter provided with a manually operable release member and including a plurality of leaves which normally are in a position where they obstruct light passing through said objective, a pivotally mounted plate in rear of said shutter for intercepting light leaking through the shutter leaves when the shutter is closed, spring means for normally holding said plate in its operative light intercepting position, means on said shutter release member for moving said plate into an inoperative non-light intercepting position when said shutter release member is actuated to release the shutter, said plate being actuated by said shutter release member in advance of the release of the shutter, a spring-actuated member for locking said plate in its inoperative non-light intercepting position, and means automatically operated by the shutter at the end of its exposure movement for releasing said spring-actuated member from said plate so that the latter return to its operative light intercepting position.

6. In a photographic camera, the combination of a casing, a photographic objective, a shutter provided with a manually operable release member and including a plurality of leaves which normally are in a position where they obstruct light passing through said objective, a pivotally mounted plate in rear of said shutter for intercepting light leaking through the shutter leaves when the shutter is closed, spring means for normally holding said plate in its operative light intercepting position, means on said shutter release member for moving said plate into an inoperative non-light intercepting position when said shutter release member is actuated to release the shutter, said plate having a notch at its circumference and being actuated by said shutter release member in advance of the release of the shutter, a spring-influenced pawl pivotally supported between its ends and extending with one end into the path of movement of said pivotally mounted plate to be oscillated by the latter until it engages said notch in said plate in the inoperative position of the latter, and a member automatically operated by the shutter at the end of its exposure movement for engaging the other end of said pawl and to oscillate the pawl in a manner that the same is lifted out of engagement with said notch in said plate, so that said plate returns to its operative light intercepting position.

WERNER SEIFERT.